Patented June 17, 1952

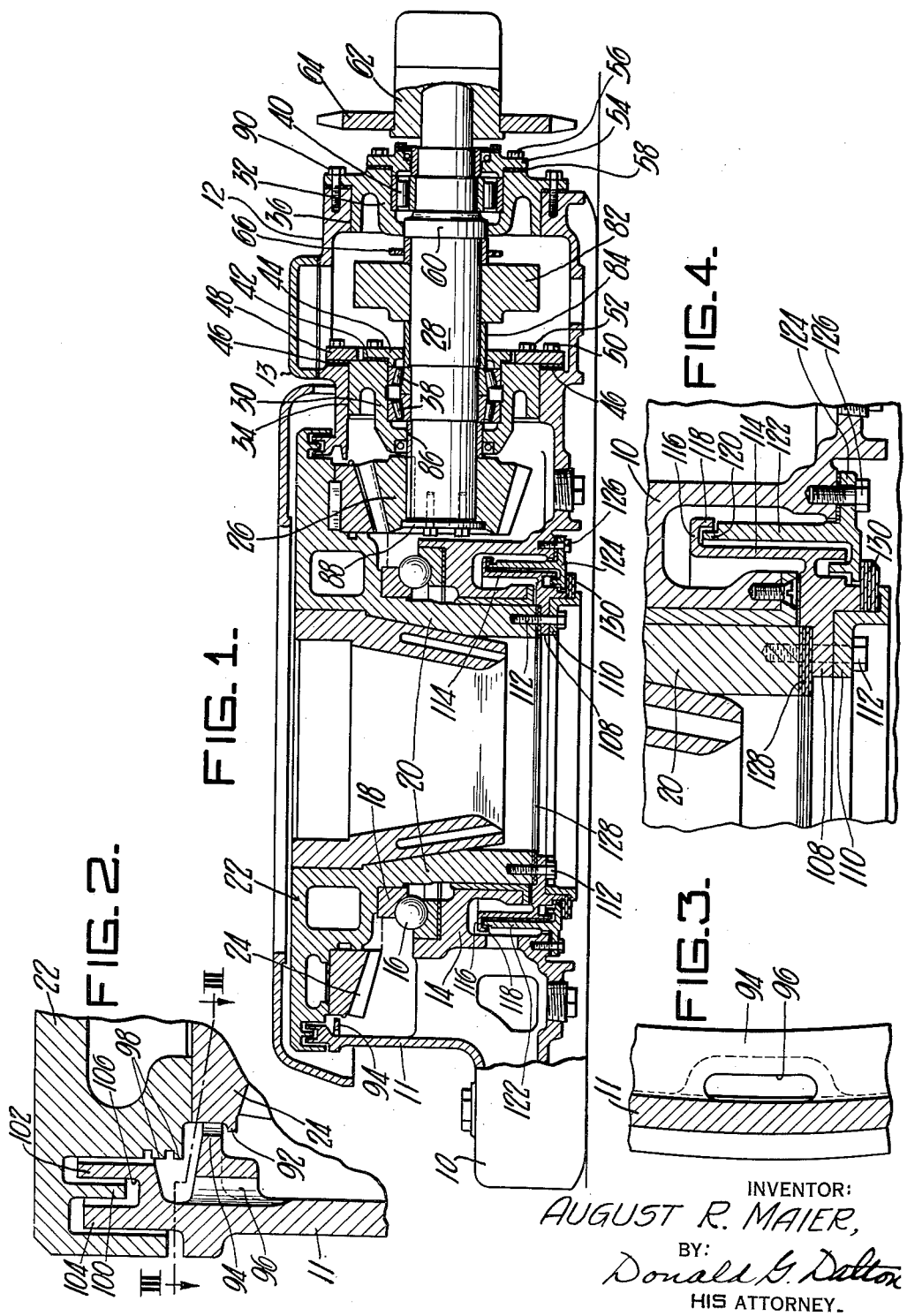

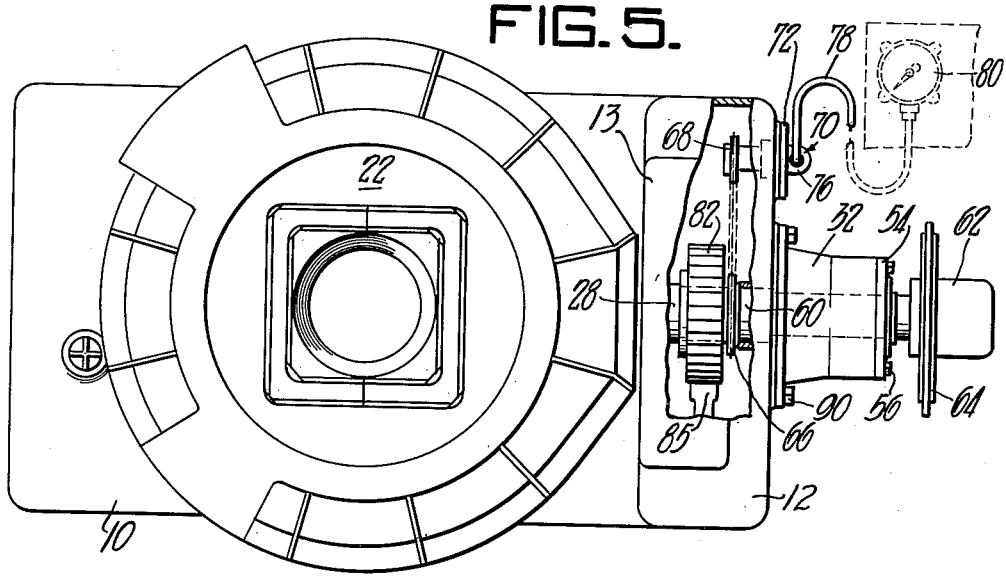

2,600,555

UNITED STATES PATENT OFFICE 2,600,555

DRIVE SHAFT ASSEMBLY FOR ROTARY WELL-DRILLING APPARATUS

August R. Maier, Oil City, Pa., assignor to United States Steel Company, a corporation of New Jersey Application September 25, 1946, Serial No. 699,188

3 Claims. (Cl. 255—23)

The present invention relates to novel features of construction and arrangement of an oil well drilling rotary including an improved unitary drive pinion shaft assembly which facilitates initial installation of the parts and subsequent removal when repair or replacement of parts thereof are required, and improved sealing means for the exclusion of drilling mud and water from the interior of the housing, together with an improved tachometer drive unit, all as more fully hereinafter described. For a full understanding of the novel features of my invention, reference is made to the accompanying drawings illustrating a preferred embodiment and the following detailed description thereof. In the drawings, Figure 1 is a longitudinal vertical section through an oil well drilling rotary embodying the invention.

Figure 2 is an enlarged fragmentary vertical section illustrating the sealing labyrinth for excluding drilling mud and water from the mechanism enclosed within the interior of the main housing.

Figure 3 is a horizontal section on line III—III of Figure 2.

Figure 4 is an enlarged vertical section showing the seal between the lower end of the rotary table and the housing in which it is journaled.

Figure 5 is a view partly in plan and partly in section illustrating an interchangeable outer bearing housing longer than the one shown in Figure 1 adapted to permit a variation of distance from the center line of the rotary table to the center line of the sprocket or other transmission member secured to the outer end of the drive shaft.

Figure 6 is a detail view of a tachometer driving unit adapted to be installed within the housing of the rotary.

Figure 7 is a detail view of a self-aligning roller bearing.

Referring in detail to the drawings, a hollow base 10 serving as an oil reservoir, has a cylindrical wall 11 upstanding thereon and a box 12 communicating therewith for accommodating a locking-dog wheel 82. The box has an opening in the top normally closed by a removable cover 13. The base 10, wall 11 and box 12 form a housing enclosing the moving parts of the rotary.

A central hub 14 extends upwardly from the base coaxially of wall 11 and supports a ball bearing 16 including a ring member 18 through which the center hub 20 of the rotary table 22 extends. Suitably secured to the underside of the rotary table there is a bevel ring gear 24 which meshes with a drive pinion 26 keyed to a pinion shaft 28.

Inner and outer bearing hubs 30 and 32 are seated in substantially cylindrical bores 34 and 36 formed in the box 12. The inner bearing hub 30 contains roller bearings 38—38 preferably of the tapered type adapted to take both thrust and radial loads. The outer bearing hub 32 contains a roller bearing 40 of the type adapted to permit endwise float or motion of the pinion shaft 28. This bearing may be of a conventional cylindrical roller type, or may take the form of a known style of self-aligning bearing such as shown in detail in Figure 7. Such a self-aligning bearing is desirable since it will compensate for any deflection in the shaft or misalignment due to wear of the inner bearing tending to cause the pinion to run out of alignment. Any self-aligning bearing with provision for end float or movement of the outer race could be used.

The inner tapered bearings 38 as shown are arranged to be adjusted longitudinally by the insertion of one or more shims 42 between the outer end face of the hub 30 and the adjacent face of a bearing retainer plate 44 secured by suitable screws as shown to the inner bearing hub.

The hub 30 may be bodily adjusted longitudinally by means of shims 46 interposed between a shoulder formed in the main box 12 and a split hub retainer ring 48 which is secured by one series of bolts 50 to the main housing and by another series of bolts 52 to the bearing hub.

The roller bearing in the outer bearing hub 32 is secured therein by a retainer member 54 held by screws 56, suitable adjusting shims 58 being interposed between the retainer 54 and the end face of the outer bearing hub as shown. The hub 32 is secured to the box 12 by screws 90 extending through holes in a peripheral flange on the hub.

An integral collar or an abutment 60 is formed on the pinion drive shaft 28 as shown in Figure 1. Floating bearing 40 abuts the outer shoulder of this collar. The outer extremity of the pinion shaft 28 is turned down to receive the hub 62 of a sprocket 64 by means of which power from a suitable transmission unit is transmitted to the drive shaft 28.

Located inwardly from the abutment 60 on the pinion drive shaft there is a sprocket 66 which is adapted to be connected by a chain to a sprocket 68 forming part of a unitary tachometer drive unit indicated as a whole at 70 and shown detached in Figure 6. This unit or subassembly includes a flanged member 72 adapted to be bolted to the margin of a hole in box 12. The sprocket 68 of this subassembly is secured to a stub shaft 74, which through any conventional gearing indicated at 76 in Figure 6, will transmit motion to a flexible shaft 78 leading to a tachometer 80, preferably located at a point for convenient observation by the operator of the drilling rig.

To install the tachometer drive unit subassembly, shown detached in Figure 6, it is merely necessary to remove the flanged member 72 which is bolted at the outer side of the box 12, whereupon the tachometer drive unit can be inserted through the opening 83 and bolted in place, and then connected by suitable sprocket chain with the overhung sprocket 68 on the end of the stub shaft 74. Obviously, instead of using a sprocket and chain drive, gears or a pulley and belt could be substituted. In this way the subassembly is located in the fully protected environment so as to avoid damage thereto. The flexible shaft leading to the tachometer at the driller's station may be covered by suitable means if desired.

Located inwardly from the tachometer drive sprocket 66 on the drive shaft 28, there is secured a ratchet type locking-dog wheel 82 adapted for engagement with a suitable locking-dog 85 which is adapted to be engaged and disengaged from the teeth of the wheel 82 by suitable means forming no part of my invention. Located inwardly from the wheel 82, there is an oil sleeve 84 whose inner end abuts the outer end face of the inner bearing 38. An oil sleeve 86 surrounding the shaft 28 is interposed between the inner face of bearing 38 and the main drive pinion 26. Endwise movement of the pinion 26 on the shaft 28 is normally prevented by an end plate 88 bolted to the shaft as shown.

The construction and arrangement of the pinion shaft and related parts as shown and described are such that the parts can be easily and quickly disassembled. The parts requiring the most frequent replacement in the drilling rig are the pinion 26, the bearings 38 and 40 and the sleeves 84 and 86 forming parts of the oil seal. With the arrangement illustrated, in case only one bearing or oil seal needs replacement, it is possible to strip that part from the shaft 28 without requiring disassembly of all of the other parts on the shaft. And any required disassembly of parts is facilitated by the simultaneous removal of the entire subassembly together with the hubs 30 and 32, which subassembly can be removed as a unit by simple endwise movement, upon disconnection of the bolts 50 from the split retainer plate 44 and removal of the bolts 90 which secure the outer bearing housing to the outer side wall of box 12. If only the inner bearing 38 requires adjustment, this may be easily accomplished without disturbing the shims 46 which position the pinion, by working through the opening in the top of the box 12.

A comparison of Figures 1 and 5 illustrates that two different length pinion shafts 28 are provided. One length, as shown in Figure 1, provides for an A. P. I. distance of 44 inches from the center line of the turntable to the center line of the sprocket rim 64, and the other, as shown in Figure 5, provides for an A. P. I. distance of 53¼ inches from the center line of the turntable to the center line of the sprocket rim. The only difference between the two assemblies is the length of the pinion shafts and the length of the outer bearing hubs 32. This arrangement provides for use of rotaries with different centers by the utilization of a minimum number of conversion parts, and is obviously an important feature from an economic standpoint.

The rotary illustrated has incorporated therein improved sealing means effective to exclude drilling mud and water from the lubricant containing chamber 12 of the rotary. This improved means is best shown in Figures 1 and 2, and includes a labyrinth arrangement differing in detail from a generally similar arrangement shown in Patent No. 2,254,183, dated August 26, 1941, issued to me and another. It will be noted that in the arrangement of Figure 2, I have retained the sling lip 92 which is incorporated with the ring gear 24 and located just below a horizontal baffle 94 extending laterally from the upright wall of the main housing 10, this baffle having drain holes or elongated slots 96 therein. I have retained the lubricant slinging lips 98 on the turntable 22 just above the baffle. In the patent mentioned, there was an additional slinging lip on the depending tongue corresponding to that shown at 100 in Figure 2, forming a part of the labyrinth seal. The slinging lip in the present instance has been eliminated from the tongue 100. As shown in Figure 2, the sealing labyrinth includes inner and outer upright annular walls 102 and 104 defining an annular groove into which the tongue 100 extends. In the former patent mentioned, drain holes were provided through the bottom of the groove enclosed by walls corresponding to those shown at 102 and 104. But such drain holes have been eliminated in my improved construction of Figure 2 because experience has shown that there is more tendency for the drilling mud and water to work its way into the groove 106 in the base of the labyrinth from outside, rather than for oil to work its way into this groove from within the wall 11. In the construction of Figure 2, therefore, I have eliminated the drain holes such as shown at 29 in the former patent, and I have eliminated the slinging lip corresponding to that shown at 28 in the patent, and I have so changed the relative heights of the annular walls 102 and 104 that the top of the inner wall 102 is in a horizontal plane higher than the plane of the top of the outer wall so that the drilling mud or water will have a tendency to drain to the outside before it will be able to reach an elevation to allow it to drain into the oil bath enclosure. It is contemplated that the groove 106 defined by the walls 102 and 104 of the labyrinth may be filled with hard grease, soap or other semi-plastic substance for providing a close clearance seal between the wall 11 and the turntable to further prevent the influx of mud or water.

To the lower end of the hub 20 of the rotary table are secured sealing rings 108 and 110 by bolts 112. Extending upwardly from the ring 108, there is an annular flange 114 having overhanging portion 116 with a depending lip 118, which overhangs the upper extremity 120 of an annular shell 122 of a sealing member 124 secured by bolts 126 to the hub 14. The described construction provides for the retention of lubricant and also for the exclusion of foreign matter, suitable shims or sealing gaskets 128 and 130 being secured in the assemblage as shown.

While I have shown and described a preferred construction and arrangement of parts which practical operation has demonstrated is highly desirable, it is to be understood that I am not strictly limited thereto since various modifications and substitutions of equivalents may be made by those skilled in the art without departure from the scope of the invention as defined in the appended claims.

I claim:

1. In a well-drilling apparatus including a rotary table, a stationary main housing supporting the table, and driving means for the table including a ring gear secured thereto, the combination therewith of a drive unit for said gear comprising a subassembly including a shaft having a drive pinion secured to the inner end thereof meshing with said gear, said housing having a closed pinion-shaft box formed as a lateral extension thereof, said box having an inner bore opening into said housing and a bore in its outer end, said bores having a common axis radial to said gear and both said bores being larger in diameter than said pinion, an inner bearing hub seated in the inner bore, an outer bearing hub separate from and independent of said inner hub seated in the outer bore, bearings in said hubs in which said shaft is journaled, a locking wheel on the shaft between said hubs smaller than said bores, a driving sprocket on said shaft outwardly of said box, and means removably securing the bearing hubs, respectively, in said bores, whereby removal of the wearing parts, such as the pinion, wheel, and bearings with their hubs, is possible without removing said wheel or the pinion from the shaft.

2. A well-drilling apparatus comprising an upright cylindrical chamber, a table rotatably journaled therein, a closed box at one side of the chamber formed as a lateral extension thereof, separate inner and outer coaxial hubs removably set in inner and outer bores in opposite ends of the box spaced along a common radius of the chamber, means individually securing each hub to its end of the box, bearings seated in said hubs, respectively, a shaft extending through the box, journaled in said bearings and driving said table through a bevel pinion and gear, a driving sprocket on said shaft outwardly of said box, said inner bore opening from said box into said chamber and both bores being larger in diameter than said pinion, a separate retainer removably secured to each hub for holding its bearing therein, and a removable cover on said box affording access to the securing means of the inner hub.

3. A well-drilling apparatus comprising an upright cylindrical chamber, a table rotatably journaled therein, a closed box at one side of the chamber formed as a lateral extension thereof and having a wall adjacent the chamber and a wall remote therefrom, said walls having inner and outer coaxial bores, respectively, therein, the axis of which is radial to said chamber, a bearing hub set in the bore of each wall, means for individually securing each hub to its wall, a bearing seated in each hub, a shaft extending through said box, journaled in said bearings and driving said table through a bevel pinion and gear, and a driving sprocket on said shaft outwardly of said box, said inner bore opening from said box into said chamber and both bores being larger in diameter than said pinion.

AUGUST R. MAIER.

REFERENCES CITED

The following references are of record in the file of this patent:

UNITED STATES PATENTS

| Number | Name | Date |
| --- | --- | --- |
| 1,212,814 | Ross | Jan. 16, 1917 |
| 1,712,955 | Gustafson | May 14, 1929 |
| 1,919,512 | Helgeby | July 25, 1933 |
| 1,976,207 | Zerbe | Oct. 9, 1934 |
| 2,009,176 | Greve | July 23, 1935 |
| 2,072,936 | Zerbe | Mar. 9, 1937 |
| 2,128,833 | Martin | Aug. 30, 1938 |
| 2,171,176 | Greve | Aug. 29, 1939 |
| 2,183,012 | Davidson | Dec. 12, 1939 |
| 2,254,183 | Maier et al. | Aug. 26, 1941 |